United States Patent
Ishihara et al.

(10) Patent No.: US 10,706,792 B2
(45) Date of Patent: Jul. 7, 2020

(54) FIELD SEQUENTIAL TYPE DISPLAY DEVICE AND DISPLAY METHOD

(71) Applicant: SHARP KABUSHIKI KAISHA, Sakai, Osaka (JP)

(72) Inventors: Tomoyuki Ishihara, Sakai (JP); Masamitsu Kobayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/332,934

(22) PCT Filed: Sep. 7, 2017

(86) PCT No.: PCT/JP2017/032302
§ 371 (c)(1),
(2) Date: Mar. 13, 2019

(87) PCT Pub. No.: WO2018/051889
PCT Pub. Date: Mar. 22, 2018

(65) Prior Publication Data
US 2019/0251919 A1    Aug. 15, 2019

(30) Foreign Application Priority Data

Sep. 14, 2016 (JP) ................................ 2016-179270

(51) Int. Cl.
*G09G 3/34* (2006.01)
*G02F 1/133* (2006.01)
(Continued)

(52) U.S. Cl.
CPC ........... *G09G 3/3413* (2013.01); *G02F 1/133* (2013.01); *G09G 3/20* (2013.01); *G09G 3/34* (2013.01);
(Continued)

(58) Field of Classification Search
CPC ................... G09G 3/20–38; G09G 2310/0235
See application file for complete search history.

(56) References Cited

U.S. PATENT DOCUMENTS

| 7,607,784 | B2 * | 10/2009 | Shimaoka | ............ | G09G 3/3413 |
| | | | | | 348/742 |
| 7,847,809 | B2 * | 12/2010 | Inazumi | ............... | G09G 3/3413 |
| | | | | | 345/690 |

(Continued)

FOREIGN PATENT DOCUMENTS

| JP | 2002-318564 A | 10/2002 |
| JP | 2003-241714 A | 8/2003 |

*Primary Examiner* — Gene W Lee
(74) *Attorney, Agent, or Firm* — ScienBiziP, P.C.

(57) ABSTRACT

A light source section 21 includes a red light source 22r, a green light source 22g, and a blue light source 22b, and one frame period is divided into four subfield periods. Light sources of each color respectively emit light in blue, green, and red subfield periods, and the red light source 22r and the green light source 22g emit light in a yellow subfield period. Light emission intensity of the blue light source 22b in the blue subfield period is set to twice light emission intensities of the red light source 22r and the green light source 22g in other subfield periods. Color breakup is reduced by displaying the yellow subfield, and light utilization efficiency improved by setting transmittance of a light modulation element 16 to 100% when a white signal by which each gradation of red, green, and blue becomes maximum is input. With this, a field sequential type display device which can reduce color breakup and has high light utilization efficiency is provided.

13 Claims, 10 Drawing Sheets

(51) Int. Cl.
*G09G 3/20* (2006.01)
*G09G 3/36* (2006.01)

(52) U.S. Cl.
CPC ............ *G09G 3/36* (2013.01); *G09G 3/3607* (2013.01); *G09G 3/3648* (2013.01); *G09G 2310/0235* (2013.01)

(56) References Cited

U.S. PATENT DOCUMENTS

| | | | | |
|---|---|---|---|---|
| 8,212,753 | B2* | 7/2012 | Tomizawa | G09G 3/2003 |
| | | | | 345/694 |
| 9,177,514 | B2* | 11/2015 | Ishihara | G09G 3/3648 |
| 9,196,189 | B2* | 11/2015 | Gandhi | G09G 3/2029 |
| 9,886,912 | B2* | 2/2018 | Kim | G09G 5/04 |
| 10,127,850 | B2* | 11/2018 | Liu | G02F 1/133603 |
| 2008/0150882 | A1* | 6/2008 | Langendijk | G02F 1/133514 |
| | | | | 345/102 |
| 2009/0167657 | A1* | 7/2009 | Tomizawa | G09G 3/2003 |
| | | | | 345/88 |
| 2013/0278650 | A1* | 10/2013 | Takahashi | G09G 3/3413 |
| | | | | 345/691 |
| 2013/0293598 | A1* | 11/2013 | Ishihara | G09G 3/3648 |
| | | | | 345/690 |
| 2016/0148584 | A1* | 5/2016 | Arai | G09G 3/2003 |
| | | | | 345/691 |

* cited by examiner

FIELD SEQUENTIAL TYPE DISPLAY DEVICE AND DISPLAY METHOD

TECHNICAL FIELD

The present invention relates to a display device, and more particularly to a display device and a display method of field sequential type.

BACKGROUND ART

In recent years, a field sequential type display device has been attracting attention as a new type display device which performs color display. In a typical field sequential type display device, one frame period is divided into three subfield periods corresponding to red, green, and blue. In a red subfield period, a light modulation section is driven based on a red video signal, and a red light source emits light. With this, a red subfield is displayed. Similarly, a green subfield is displayed in a green subfield period, and a blue subfield is displayed in a blue subfield period. Color display can be performed by displaying the red, green, and blue subfields in a switching manner at high speed.

The field sequential type display device does not have a color filter. Therefore, it is possible to improve light utilization efficiency and realize a background transparent type display device. Furthermore, the field sequential type display device performs color display using one type of pixels instead of red, green, and blue subpixels. Therefore, it possible to reduce a number of pixels required for performing color display and realize a high resolution display device.

In a field sequential type display device which displays the red, green, and blue subfields in one frame period, when an observer's line of sight moves in a display screen, the observer may see colors of each subfield separately (this phenomenon is hereinafter referred to as color break). As a method for reducing the color break, there is known a method in which a subfield corresponding to a mixed color such as white, yellow, cyan, and magenta is displayed in addition to the red, green, and blue subfields in one frame period. In a mixed color subfield period, two or more of the red light source, a green light source, and a blue light source emit light.

Patent Document 1 describes a field sequential type liquid crystal display device which displays red, green, blue, and white subfields in one frame period in order to suppress the color break. In a white subfield period, the red light source, the green light source, and the blue light source emit light Patent Document 1 discloses a method for obtaining a video signal of four colors (red, green, blue, and white video signals) corresponding to each subfield, based on an input video signal of three colors (red, green, and blue video signals).

PRIOR ART DOCUMENT

Patent Document

[Patent Document 1] Japanese Laid-Open Patent Publication No. 2002-318564

SUMMARY OF THE INVENTION

Problems to be Solved by the Invention

Hereinafter, in a display device including light sources which emit light in different colors, light emission intensities of the light sources of each color are said to be same, when a light modulation section is set to a maximum modulation degree and the light sources of each color are made to emit light with each intensity so that a display color becomes white (so that chromaticity of the display color matches chromaticity of white defined for the display device). Note that even when the light emission intensities of the light sources of each color are same, drive conditions (voltage, current, length of light emission period, or the like) of the light sources of each colon are different in general.

Furthermore, a conventional field sequential type display device having a subfield period in which two types of light sources among the red light source, the green light source, and the blue light source emit light is referred to as a "conventional display device". In the conventional display device, the light sources of each color emit light with a same light emission intensity in each subfield period. FIG. 11 is a diagram showing light emission intensities of the light sources and transmittance of a light modulation element when displaying white by which each gradation of red, green, and blue becomes maximum, in the conventional display device having a yellow subfield period. As shown in FIG. 11, in the conventional display device, the red light source emits light with a same light emission intensity E in the red subfield period and the yellow subfield period. The green light source emits light with the same light emission intensity E as the red. light source in the green subfield period and the yellow subfield period. The blue light source emits light with the same light emission intensity E as the red light source and the green light source in the blue subfield period.

However, the above-described conventional display device has a problem that light utilization efficiency is low. In a general video signal, a white signal by which each gradation of red, green, and blue becomes maximum corresponds to highest display luminance. Thus, maximum luminance of the display device is defined as luminance of a display screen when the white signal is input. In the conventional display device, it is assumed that transmittance of the light modulation element is set to a maximum value of 100% in all subfield periods when the white signal is input. At this time, the display color becomes yellowish white rather than white. In order to make the display color white, it is necessary to set the transmittance of the light modulation element in the red, green, and yellow subfield periods to 50% as shown in FIG. 11.

In the conventional display device, the transmittance of the light modulation element in the red, green, and yellow subfield periods is set to 50% when the white signal is input. In this manner, there exists a subfield in which the transmittance of the light modulation element is not set to the maximum value, when a video signal to be displayed with maximum luminance is input. Thus, in the conventional display device, the light utilization efficiency is low and power consumption of a light source section becomes larger than necessary. The above-described problem can not be solved even by the field sequential type liquid crystal display device described in Patent Document 1.

Therefore, providing a display device and a display method of field sequential type which can reduce color break and have high light utilization efficiency is taken as a problem.

Means for Solving the Problems

The above-described problem can be solved for example, by a field sequential type display device described below.

The field sequential type display device includes: a light source section including first to third light sources configured to emit light in first to third colors respectively; and a light modulation section including light modulation elements and configured to modulate light emitted from the light source section, one frame period is divided into three subfield periods in each of which one of the first to third light sources emits light and a subfield corresponding to one of the first to third colors is displayed, and one subfield period in which the first and second light sources emit light and a subfield corresponding to a fourth color is displayed, and light emission intensity of the third light source in the subfield period in which the third light source emits light is set to twice light emission intensities of the first and second light sources in other subfield periods.

The above-described problem can be solved for example, by a display method in a field sequential type display device described below. The display method in the field sequential type display device is a display method in a field sequential type display device having a light source section including first to third light sources that emit light in first to third colors respectively, and a light modulation section that includes light modulation elements and modulates light emitted from the light source section, the method includes steps of: dividing one frame period into four subfield periods; displaying a subfield corresponding to one of the first to third colors by making one of the first to third light sources emit light in each of three of the four subfield periods; and displaying a subfield corresponding to a fourth color by making the first and second light sources emit light in a remaining subfield period, and light emission intensity of the third. light source in the subfield period in which the third light source emits light is set to twice light emission intensities of the first and second light sources in other subfield period.

Effects of the Invention

According to such a field sequential type display device and such a field sequential type display method in the field. sequential type display device, color break can be reduced by displaying the subfield corresponding to the fourth color which is a mixed color of the first and second colors, in one frame period in addition to the three subfields corresponding to the first to third colors. Furthermore, by setting the light emission intensity of the third light source in the subfield period in which the third light source emits light to twice the light emission intensities of the first and second light sources in other subfield periods, light intensity of the light emitted from the light modulation section can be maximized in all subfield periods in one frame period when a white signal is input. Therefore, light utilization efficiency can be improved and power consumption of the light source section can be reduced.

MODES FOR CARRYING OUT THE INVENTION

First Embodiment

Figure 1:
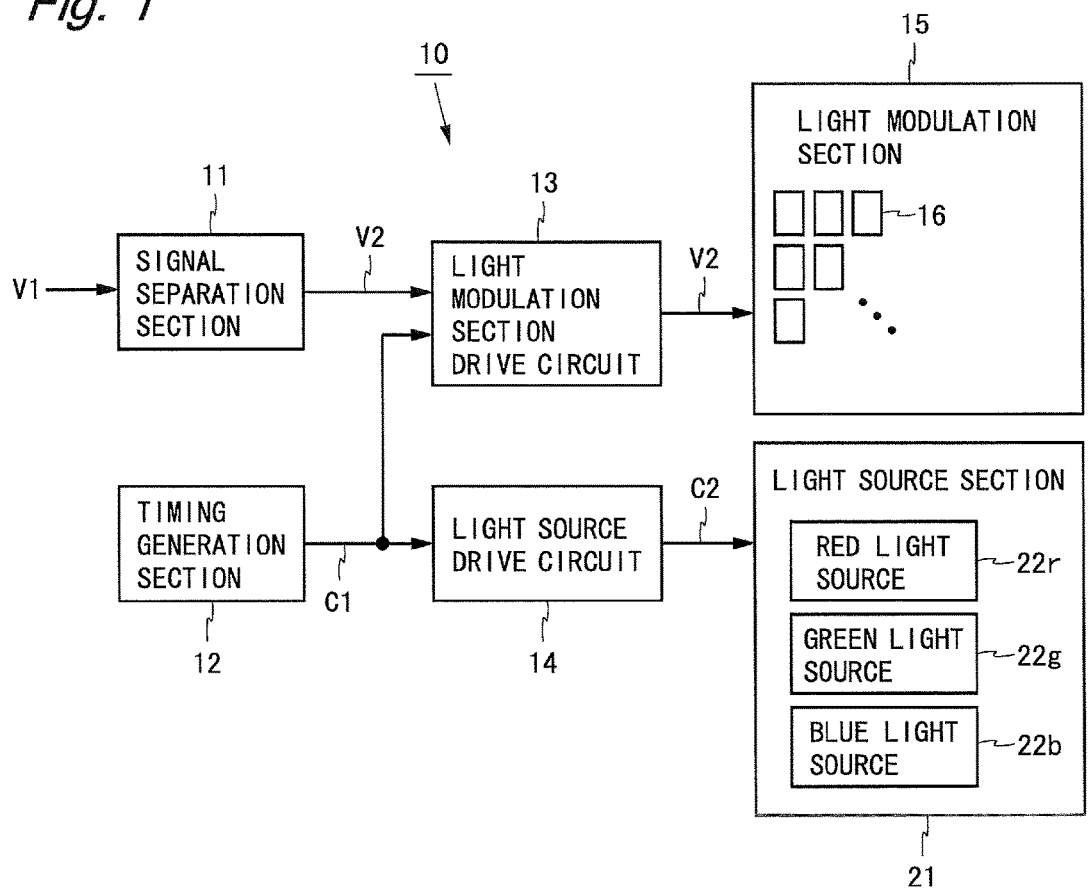
FIG. 1 is a block diagram showing a configuration of a display device according to a first embodiment.

FIG. 1 is a block diagram showing a configuration of a display device according to a first embodiment. A display device 10 shown in FIG. 1 includes a signal separation section 11, a timing generation section 12, a light modulation section drive circuit 13, a light source drive circuit 14, a light modulation section 15, and a light source section 21. The light source section 21 includes a red light source 22r which emits light in red, a green light source 22g which emits light in green, and a blue light source 22b which emits light in blue. Hereinafter, the red light source 22r, the green light source 22g, and the blue light source 22b may be collectively referred to as light sources 22.

The display device 10 is a field sequential type display device which displays four subfields in one frame period. In the display device 10, one frame period is divided into four subfield periods corresponding to red, green, blue, and yellow. The display device 10 displays red, green, blue, and yellow subfields in one frame period in an order described later.

A video signal V1 is externally input to the display device 10. The video signal V1 includes a red video signal, a green video signal, and a blue video signal. The signal separation section 11 generates a video signal V2 corresponding to each subfield based on the video signal V1, and outputs the generated video signal V2 to the light modulation section drive circuit 13. The video signal V2 includes a red video signal, a green video signal, a blue video signal, and a yellow video signal. In this manner, the signal separation section 11 obtains the video signal V2 of four colors used for driving the light modulation section 15, based on the input video signal V1 of three colors. The timing generation section 12 outputs a timing control signal C1 showing each subfield period, to the light modulation section drive circuit 13 and the light source drive circuit 14.

The light modulation section drive circuit 13 drives the light modulation section 15 based on the video signal V2 and the timing control signal C1. More specifically, in accordance with the timing control signal C1, the light modulation section drive circuit 13 outputs the video signal V2 corresponding to each subfield period to the light modulation section 15 in each subfield period.

The light modulation section 15 includes light modulation elements 16 arranged two-dimensionally. The light modulation element 16 corresponds to a pixel. The video signal V2 corresponding to each subfield includes video data corresponding to the light modulation elements 16 included in the light modulation section 15. The light modulation element 16 modulates light emitted from the light source section 21 to a degree depending on corresponding video data. For example, when the light modulation element 16 is an element for changing transmittance of light, transmittance of the light modulation element 16 changes depending on the corresponding video data.

The light source drive circuit 14 drives the light source section 21 based on the timing control signal C1. More specifically, in accordance with the timing control signal C1, the light source drive circuit. 14 outputs, to the light source section 21, a control signal C2 which makes the light source 22 of a predetermined type emit light in each subfield period.

The light source section 21 irradiates a front surface or a back surface of the light modulation section 15 with light. For example, the light source section 21 may be an edge light type backlight in which the light sources 22 are disposed along side surface of a light guide plate (not shown) provided on back surface side of the light modulation section 15. Alternatively, the light source section 21 may be a direct type backlight in which the light sources 22 are arranged two-dimensionally on the back surface side of the light modulation section. 15. Alternatively, when the light modulation element 16 is an element which changes reflectance of light, the light source section 21 may be a front light which irradiates the front surface of the light modulation section 15 with light.

In the display device 10, for example, a liquid crystal panel may be used as the light modulation section 15 and an LED (Light Emitting Diode) backlight including LEDs may be used as the light source section 21. With this, a field sequential type liquid crystal display device can be configured. Alternatively, the light modulation section 15 and the light source section 21 may be configured using other members. Other display devices of field sequential type may be configured by a method similar to that for the field sequential type liquid crystal display device.

Figure 2:
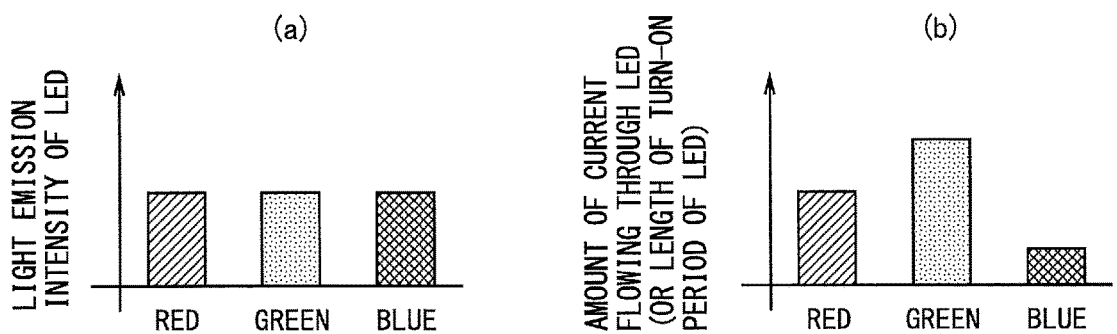
FIG. 2 is a diagram for explaining light emission intensity of a light source.

In the display device 10, light emission intensities of the red light source 22r, the green light source 22g, and the blue light source 22b are defined to be same, when the light modulation section 15 is set to a maximum modulation degree, and the red light source 22r, the green light source 22g, and the blue light source 22b are made to emit light with each intensity so that chromaticity of a display color matches chromaticity of white defined for the display device 10. For example, when the light source 22 is the LED, light emission intensity of the light source 22 depends on an amount of current flowing through the LED and a length of a turn-on period of the LED. Thus, even when light emission intensities of LEDs of the three colors are same as shown in FIG. 2(*a*), amounts of currents flowing through the LEDs of the three colors are not always same, and lengths of the turn-on periods of the LEDs of the three colors are not always same, as shown in FIG. 2(*b*).

Figure 3:
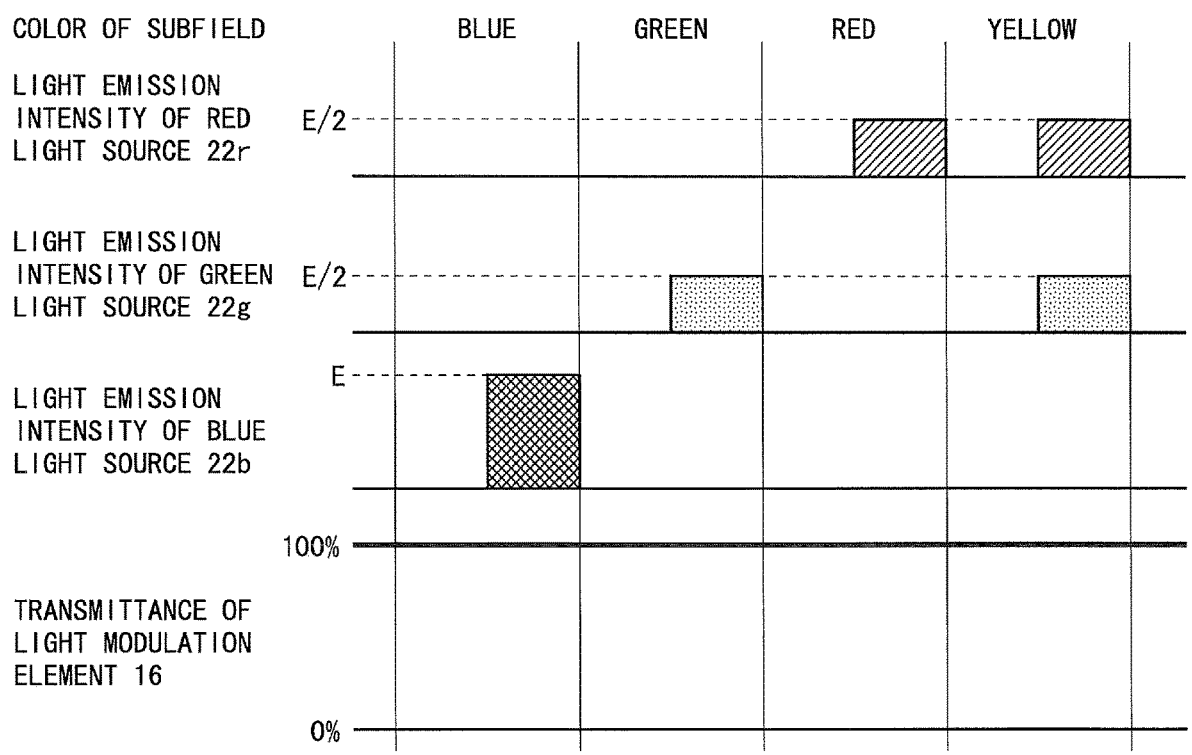
FIG. 3 is a diagram showing light emission intensities of light sources and transmittance of a light modulation element when displaying white by which each gradation of red, green, and blue becomes maximum, in the display device according to the first embodiment.

FIG. 3 is a diagram showing light emission intensities of the light sources 22 and transmittance of the light modulation element 16 when displaying white by which each gradation of red, green, and blue become: maximum, in the display device 10. Here, it is assumed that the light modulation element 16 is an element for changing transmittance of light and the display device 10 displays four subfields in one frame period in an order of blue, green, red, and yellow. As shown in FIG. 3, the blue light source 22b emits light in the blue subfield period, the green light source 22g emits light in the green subfield period, and the red light source 22r emits light in the red subfield period. In the yellow subfield period, the red light source 22r and the green light source 22g emit light.

In the red subfield period and the yellow subfield period, the red light source 22r emits light with a same light, emission intensity E/2. In the green subfield period and the yellow subfield period, the green light source 22g emits light with the same light emission intensity E/2 as the red light source 22r. In the blue subfield period, the blue light source 22b emits light with a light emission intensity E twice that of the red light source 22r and the green light source 22g. In this manner, the light emission intensity of the blue light source 22b in the blue subfield period is set to twice the light. emission intensities of the red light source 22r and the green light source 22g in other subfield periods. Transmittance of the light modulation element 16 is set to a maximum value of 100% in the blue, green, red, and yellow subfield periods.

Figure 11:
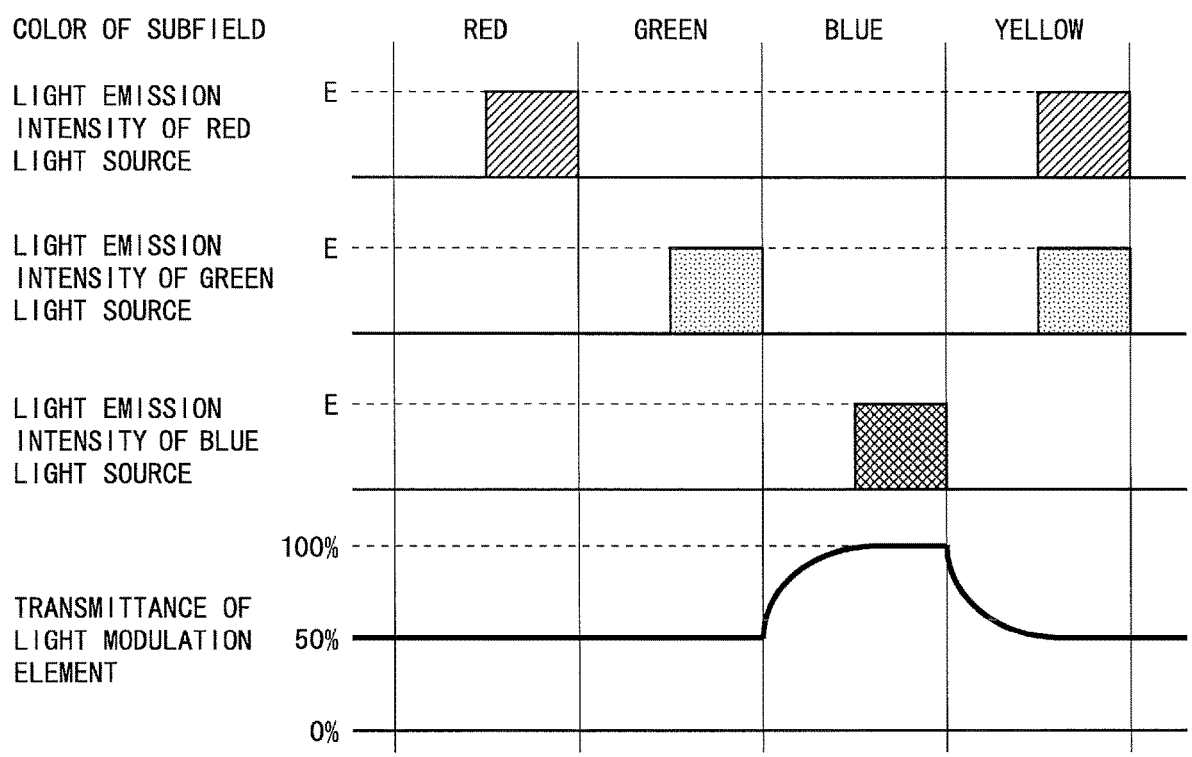
FIG. 11 is a diagram showing light emission intensities of light sources and transmittance of a light modulation element when displaying white by which each gradation of red, green, and blue becomes maximum, in a conventional display device.

As described with reference to FIG. 11, in the conventional display device, the light sources of each color emit light with a same light emission intensity in each subfield period. Thus, in order to make the display color white in the conventional display device, it is necessary to set transmittance of the light modulation element in the red, green, and yellow subfield periods to 50%. As a result, in the conventional display device, light utilization efficiency is low and power consumption of the light source section becomes larger than necessary.

in contrast, in the display device 10 according to the present embodiment, the light emission intensity of the blue light source 22b in the blue subfield period is set to twice the light emission intensities of the red light source 22r and the green light source 22g in other subfield periods. Thus, when light emitted from the red light source 22r, the green light source 22g, and the blue light source 22b are synthesized in one frame period, white light is obtained. Therefore, when the transmittance of the light modulation element 16 is set to the maximum value of 100% in all subfield periods, a display color becomes white. Thus, in the display device 10, the transmittance in each subfield period can be set to the maximum value of 100% when a white signal by which each gradation of red, green, and blue becomes maximum is input. Therefore, according to the display device 10 according to the present embodiment, light utilization efficiency can be improved and power consumption of the light source section 21 can be reduced, when compared with the conventional display device.

Figure 4:
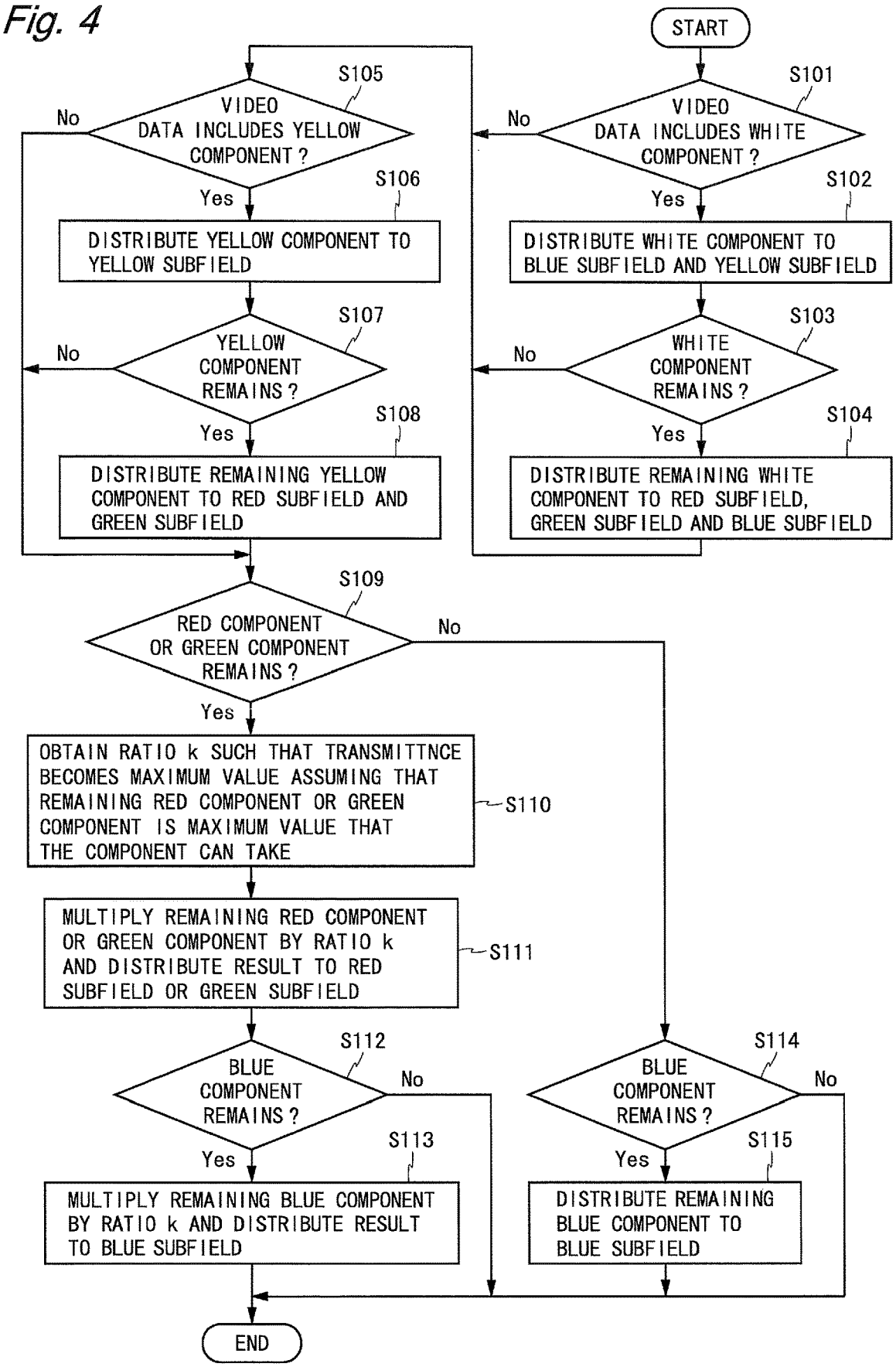
FIG. 4 is a flowchart showing an operation of a signal separation section of the display device according to the first embodiment.

FIG. 4 is a flowchart showing an operation of the signal separation section 11. The signal separation section 11 performs processing shown in FIG. 4 on video data of each pixel included in the input video signal V1. In the processing shown in FIG. 4, target display intensities of the red, green, blue, and yellow subfields are obtained based on video data of one pixel including a red component, a green component, and a blue component, and transmittances of the light modulation element 16 in the red, green, blue, and yellow subfields are obtained based on the obtained target display intensities. In the following, a minimum value and a maximum value that the red component, the green component, and the blue component included in the video data can take are assumed to be 0 and P, respectively. Initial values of the target display intensities of the red, green, blue, and yellow subfields are set to 0.

First, the signal separation section 11 determines whether the video data includes a white component (step S101). In step S101, it is determined Yes if a minimum value of the red component, the green component, and the blue component included in the video data exceeds 0 (minimum value that each component can take), and is determined No otherwise. The signal separation section 11 goes to step S102 if Yes in step S101, and goes to step S105 if No in step S101.

In the former case, the signal separation section. 11 distributes the white component included in the video data to the blue subfield and the yellow subfield (step S102). In step S102, when the white component is not larger than P/2, entire of the white component is distributed to the blue and yellow subfields, and when the white component exceeds P/2, only P/2 of the white component is distributed to the blue and yellow subfields. When a distribution amount to the blue and yellow subfields is X1, X1 is respectively subtracted from the red component, the green component, and the blue component included in the video data, and X1 is respectively added to the target display intensities of the blue and yellow subfields.

Next, the signal separation section 11 determines whether the white component remains in the video data at this time point (step S103). The signal separation section 11 goes to step S104 if Yes in step S103, and goes to step S105 if No in step S105. In the former case, the signal separation section distributes the remaining white component to the red subfield, the green subfield, and the blue subfield (step S104). In step S104, when the remaining white component is X2, X2 is respectively subtracted from the red component, the green component, and the blue component included in the video data, and X2 is respectively added to the target display intensities of the red, green, and blue subfields. The signal separation section 11 goes to step S105 after executing step S104.

In step 3105, the signal separation section 11 determines whether the video data at this time point includes a yellow component. In step S105, it is determined. Yes if a minimum value of the red component and the green component included in the video data at this time point exceeds 0, and is determined No otherwise. The signal separation section 11 goes to step S106 if Yes in step S105, and goes to step S109 if No in step S105.

In the former case, the signal separation section 11 distributes the yellow component included in the video data at this time point to the yellow subfield (step S106). Before executing step S106, an amount obtained by subtracting a distribution amount to the yellow subfield in step S102 from P/2 is distributable to the yellow subfield. In step S106, only an amount distributable to the yellow subfield out of the yellow component is distributed to the yellow subfield. When the distribution amount to the yellow subfield is X3, X3 is respectively subtracted from the red component and the green component included in the video data at this time point, and X3 is added to the target display intensity of the yellow subfield.

Next, the signal separation section 11 determines whether the yellow component remains in the video data at this time point (step S107). The signal separation section 11 goes no step S108 if Yes in step S107, and goes to step S109 if No in step S107. In the former case, the signal separation section distributes the remaining yellow component to the red subfield and the green subfield (step S108) in step S108, when the remaining yellow component is X4, X4 is respectively subtracted from the red component and the green component included in the video data, and X4 is respectively added to the target display intensities of the red and green subfields.

In the video data before executing step S109, at least one of the red component and the green component is 0. In step S109, the signal separation section 11 determines whether the red component or the green component remains in the video data at this time point. The signal separation section. 11 goes to step S110 if Yes in step S109, and goes to step S114 if No in step S109.

If Yes in step S109, the signal separation section 11 obtains a ratio k (0<K≤1) such that the transmittance becomes the maximum. value of 100% assuming that the remaining red component or green component is a maximum value that the component can take (step S110). In step S110, when a maximum value that the remaining red component or green component can take is X5 and the target display intensity of the red or green subfield at this time point is X6, (P/2−X6)/X5 is obtained as the ratio k. Next, the signal separation section 11 multiplies the remaining red component or green component by the ratio k and distributes an obtained result to the red subfield or the green subfield (step S111). In step S111, when the remaining red component or green component is X7, X7 is subtracted from the red component or the green component included in the video data, and (k×X7) is added to the target display intensity of the red or green subfield.

Next, the signal separation section 11 determines whether the blue component remains in the video data at this time point (step S112). The signal separation section 11 goes to step S113 if Yes in step S112, and finishes the processing if No in step S112. In the former case, the signal separation section 11 multiplies the remaining blue component by the ratio k obtained in step S110 and distributes an obtained result to the blue subfield (step S113). In step S113, when the remaining blue component is X8, X8 is subtracted from the blue component included in the video data, and (k×X8) is added to the target display intensity of the blue subfield. The signal separation section 11 finishes the processing after executing step S113.

If No in step S109, the signal separation section 11 determines whether the blue component remains in the video data at this time point (step S114). The signal separation section 11 goes to step S115 if Yes in step S114, and finishes the processing if No in step S114. In the former case, the signal separation section 11 distributes the remaining blue component to the blue subfield (step S115) in step S115, when the remaining blue component is X8, X8 is subtracted from the blue component included in the video data, and X8 is added to the target display intensity of the blue subfield. The signal separation section 11 finishes the processing after executing step S115.

Figure 5:
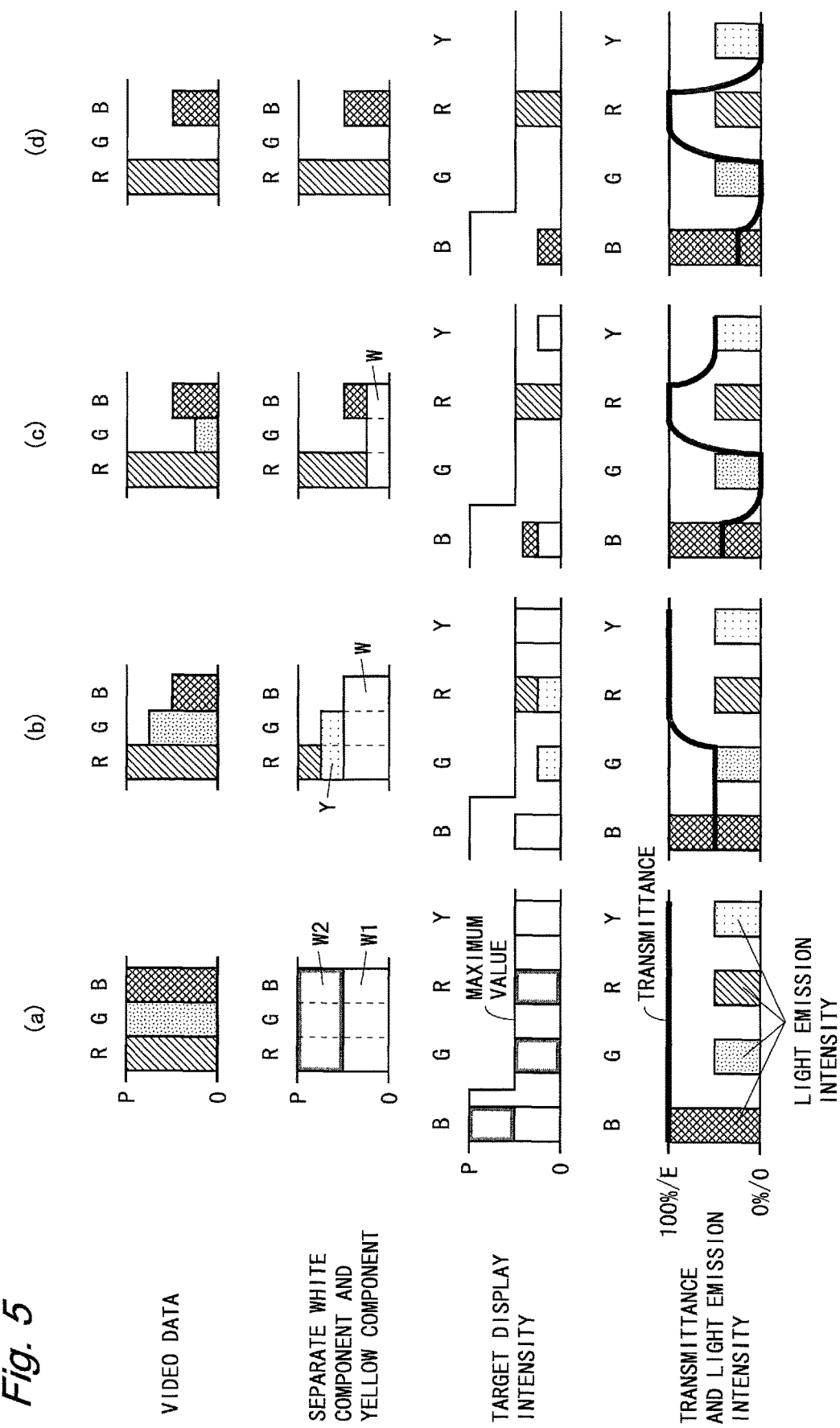
FIG. 5 is a diagram showing processing results by the signal separation section of the display device according to the first embodiment.

FIG. 5 is a diagram showing processing results by the signal separation section 11. When the video data (R, G, B) equals to (P, P, P) (FIG. 5(*a*)), the white component included in the video data is P and the yellow component included in the video data is 0. P/2 (portion described as W1) of the white component is distributed to the blue subfield and the yellow subfield in step S102. Remaining P/2 (portion described as W2) is distributed to the red subfield, the green subfield, and the blue subfield in step S104. As a result, the target display intensities of the blue, green, red, and yellow subfields become P, P/2, P/2, and P/2, respectively. Since the light emission intensities of the light sources 22 in the blue, green, red, and yellow subfields are respectively B, E/2, E/2, and E/2, transmittances of the light, modulation element 16 in the blue, green, red, and yellow subfields all become equal to the maximum value of 100%.

When the video data (R, G, B) equals to (P, 3P/4, P/2) (FIG. 5(b)), the white component included in the video data is P/2 and the yellow component included in the video data is P/4 The white component is distributed to the blue subfield and the yellow subfield in step S102. The yellow component is distributed to the red subfield and the green subfield in step S108. Before executing step S109, there remains the red component of P/4. In step S110, 1 is obtained as the ratio k, and the remaining red component multiplied by and distributed to the red subfield in step S111. As a result, the target display intensities of the blue, green, red, and yellow subfields become P/2, P/4, P/2, and P/2, respectively. Therefore, the transmittances of the light modulation element 16 in the blue, green, red, and yellow subfields become 50%, 50%, 100%, and 100%, respectively.

When the video data (R, G, B) equals to (P, P/4, P/2) (FIG. 5(c)), the white component included in the video data is P/4, and the yellow component included in the video data is 0. The white component is distributed to the blue subfield and the yellow subfield in step S102. Before executing step S109, there remain the red component of 3P/4 and the blue component of P/4. In step S110, 2/3 (=(P/2)/(3P/4)) is obtained as the ratio k. The remaining red component is multiplied by ⅔ and distributed to the red subfield in step S111, and the remaining blue component is multiplied by ⅔ and distributed to the blue subfield in step S113. As a result, the target display intensities of the blue, green, red, and yellow subfields become 5P/12, 0, P/2, and P/4, respectively. Therefore, the transmittances of the light modulation element 16 in the blue, green, red, and yellow subfields become 42%, 0%, 100%, and 50%, respectively.

When the video data (R, G, B) equals to (P, 0, P/2) (FIG. 5(d)), the white component and the yellow component included in the video data are 0. Before executing step S109, there remain the red component of P and the blue component of P/2. In step S110, 1/2 (=(P/2)/P) is obtained as the ratio B. The remaining red component is multiplied by ½ and distributed to the red subfield in step S111, and the remaining blue component is multiplied by ½ and distributed to the blue subfield in step S113. As a result, the target display intensities of the blue, green, red, and yellow subfields become P/4, 0, P/2, and 0, respectively. Therefore, the transmittances of the light modulation element 16 in the blue, green, red, and yellow subfields become 25%, 0%, 100%, and 0%, respectively.

As shown in FIG. 5(a), when the video data (R, G, B) equals to (P, P, P), the transmittances of the light modulation elements 16 in the blue, green, red, and yellow subfields all become the maximum value of 100%. In other words, when the white signal by which each gradation of red, green, and blue becomes maximum is input, the light modulation section 15 is set to a maximum modulation degree in all subfield periods in one frame period. With this, when the white signal is input, light intensity of light output from the light modulation section 15 can be maximized and light utilization efficiency can be improved.

Furthermore, when distributing luminance included in the video signal V1 of the three colors to the four subfields of red, green, blue, and yellow, the signal separation section 11 sets maximum gradations distributable to the red, green, and yellow subfields to half of the maximum gradation distributable to the blue subfield in steps S102, S106, S110, and S111 shown in FIG. 4. With this, the video signal V2 of the four colors used for driving the light modulation section 15 can be obtained considering the light emission intensities of the light sources 22 in each subfield period.

Note that a gradation of the video signal V1 often has a nonlinear characteristic (gamma characteristic) with respect to luminance. When the gradation has the nonlinear characteristic with respect to luminance, the signal separation section 11 performs the above-described processing after converting the gradation of the video signal V1 to a linear gradation which is linear to luminance. That is, the signal separation section 11 converts the gradation of the input video signal V1 to the linear gradation which is linear to luminance, sets maximum linear gradations distributable to the red, green, and yellow subfields to half of the maximum linear gradation distributable to the blue subfield, and distributes the linear gradation to the red, green, blue, and yellow subfields. The same holds true for second and third embodiments described later.

In the following, preferable display orders of the subfields when a response speed of the light modulation element 16 is slow are described with respect to the display device 10. For example, when the light modulation element 16 is a liquid crystal element, a sufficient response speed may not be realized depending on a material of liquid crystal and operating conditions of the display device. Thus, the inventor conducted an experiment to evaluate apparent uncomfortable feeling due to a color shift caused by a shortage of the response speed, and obtained following knowledge about a color close to yellow.

First knowledge: "When luminance of the color close to yellow is insufficient, the uncomfortable feeling is large".

Second knowledge: "The uncomfortable feeling is smaller when the color close to yellow shifts in a red direction than when the color close to yellow shifts in a green direction".

Third knowledge: "Effect of reducing color break is enhanced when the yellow subfield is displayed between the red subfield and the green subfield".

When the display device 10 display: tie color close to yellow, the transmittance of the light modulation element 16 is low in the blue subfield and is high in the red, green, and yellow subfields. At this time, after a subfield period in which the transmittance of the light modulation element 16 is low appears once, subfield periods in which the transmittance of the light modulation element 16 is high continue three times. Therefore, when displaying the blue subfield in a first place in one frame period, the transmittance of the light modulation element 16 gradually increases in subfield periods of other than blue (see FIG. 6(a)). In this case, the transmittance of the light modulation element 16 becomes higher in later subfield periods in one frame period.

Figure 6:
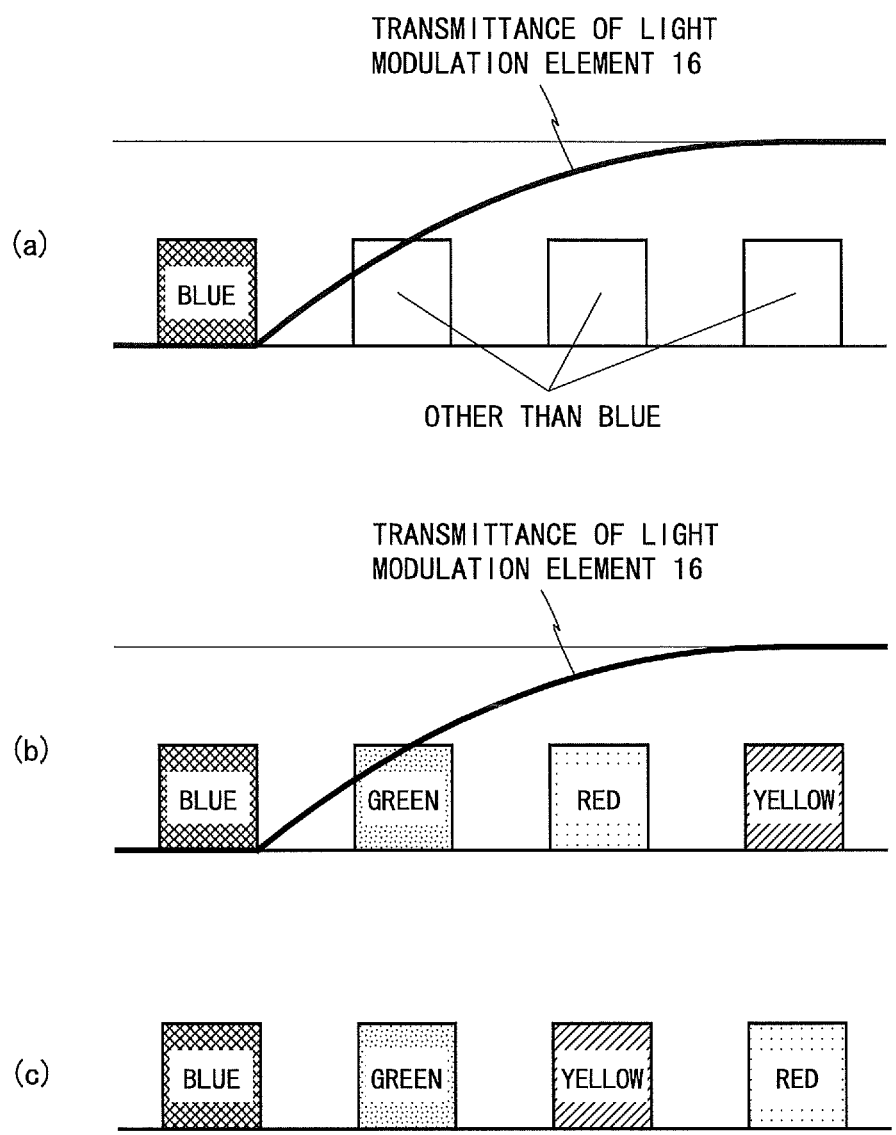
FIG. 6 is a diagram showing display orders of subfields in the display device according to the first embodiment.

Considering the first knowledge, it is preferable to display the yellow subfield in a last subfield period in one frame period in which the transmittance can be maximized. Considering the second knowledge, it is preferable to display the red subfield rather than the green subfield in a later subfield period in one frame period in which the transmittance is higher. Therefore, when considering the first and second knowledge, an order of (blue, green, red, yellow) shown in FIG. 6(b) is preferable as a display order of subfields in the display device 10. Furthermore, in order to enhance the effect of reducing the color break, considering the second and third knowledge, an order of (blue, green, yellow, red)

shown in FIG. 6(c) is preferable as the display order of subfields in the display device 10.

The display device 10 displays four kinds of subfields in the same order also in a next frame period. Therefore, when considering the first and second knowledge, in addition to the order of (blue, green, red, yellow), three orders of (yellow, blue, green, red), (red, yellow, blue, green), and (green, red, yellow, blue) are also preferable as the display order of the subfields in the display device 10. By using these four display orders, uncomfortable feeling due to the color shift of the color close to yellow can be reduced. Furthermore, considering the second and third knowledge, in addition to the order of (blue, green, yellow, red), three orders of (red, blue, green, yellow), (yellow, red, blue, green) and (green, yellow, red, blue) are also preferable as the display order of the subfields in the display device 10. By using these four display orders, the effect of reducing the color break can be enhanced while reducing the uncomfortable feeling due to the color shift of the color close to yellow.

As described above, the display device 10 according to the present embodiment includes the light source section 21 including first to third light sources (red light source 22r, green light source 22g, and blue light source 22b) that emit light in first to third colors, and the light modulation section 15 that includes the light modulation elements 16 and modulates light emitted from the light source section 21. One frame period is divided into three subfield periods (red, green, and blue subfield periods) in each of which one of the first to third light sources emits light and a subfield (red, green, and blue subfield) corresponding to one of the first to third colors is displayed, and one subfield period (yellow subfield period) in which the first and second light sources (red light source 22r and green light source 22g) emit light and a subfield (yellow subfield) corresponding to a fourth color (yellow) is displayed. The light emission intensity of the third light source in the subfield period (blue subfield period) in which the third light source (blue light source 22b) emits light is set to twice the light emission intensities of the first and second light sources in other subfield periods (red, green, and yellow subfield periods).

In this manner, color break can be reduced by displaying the subfield corresponding to the fourth color which is a mixed color of the first and second colors, in one frame period in addition to the three subfield s corresponding to the first to third colors. Furthermore, by setting the light emission intensities of the first to third light sources as described above, light intensity of the light emitted from the light modulation section 15 can be maxima in all subfield periods in one frame period when the white signal is input. Therefore, light utilization efficiency can be improved and power consumption of the light source section 21 can be reduced in this manner, the field sequential type display device 10 which can reduce color break and has high light utilization efficiency can be provided.

When the white signal by which each gradation of the first to third colors becomes maximum is input, the light modulation section 15 is set to the maximum modulation degree in all subfield periods in one frame period. With this, when the white signal is input, the light intensity of the light output from the light modulation section 15 can be maximized and the light utilization efficiency can be improved.

Furthermore, the display device 10 includes the signal separation section 11 that obtains the video signal V2 of the four colors used for driving the light, modulation section 15, based on the input video signal V1 of the three colors. The signal separation section 11 converts the gradation of the video signal of the three colors to the linear gradation which is linear to luminance, sets the maximum linear gradations distributable to the subfields corresponding to the first, second, and fourth colors (red, green, and yellow subfields) to half of the maximum linear gradation distributable to the subfield corresponding to the third color (blue subfield), and distributes the linear gradation to four subfields corresponding to the first to fourth colors. With this, the video signal V2 of the four colors used for driving the light modulation section 15 can be obtained considering the light emission intensities of the light sources 22 in each subfield period.

Furthermore, in the display device 10, the first color is red, the second color is green, the third color is blue, and the fourth color is yellow. Therefore, the above-described effects can be attained with respect to a field sequential type display device which displays red, green, blue, and yellow subfields. In particular, the uncomfortable feeling due to the color shift of the color close to yellow can be reduced, by displaying the four subfields corresponding to the first to fourth colors from a beginning of one frame period in one of the order of blue, green, red, and yellow, the order of yellow, blue, green, and red, the order of red, yellow, blue, and green, and the order of green, red, yellow, and blue. Alternatively, the effect of reducing the color break can be enhanced while reducing the uncomfortable feeling due to the color shift of the color close to yellow, by displaying the four subfields from the beginning of one frame period in one of the order of blue, green, yellow, and red, the order of red, blue, green, and yellow, the order of yellow, red, blue, and green, and the order of green, yellow, red, and blue.

Furthermore, when the light modulation section 15 is configured by a liquid crystal panel, the above-described effects can be attained with respect to a field sequential type liquid crystal display device. Furthermore, when the light source section 21 is configured by a backlight including LEDs as the first to third light sources the above-described effects can be attained with respect to a field sequential type liquid crystal display device including a backlight including LEDs.

Second Embodiment

A display device according to a second embodiment has a same configuration as the display device according to the first embodiment (see FIG. 1). As with the display device according to the first embodiment, the display device according to the present embodiment is a field sequential type display device which displays four subfields in one frame period. However, in the display device according to the present embodiment, one frame period is divided into four subfield periods corresponding to red, green, blue, and cyan. The display device according to the present embodiment displays red, green, blue, and cyan subfields in one frame period in an order described later.

Figure 7:
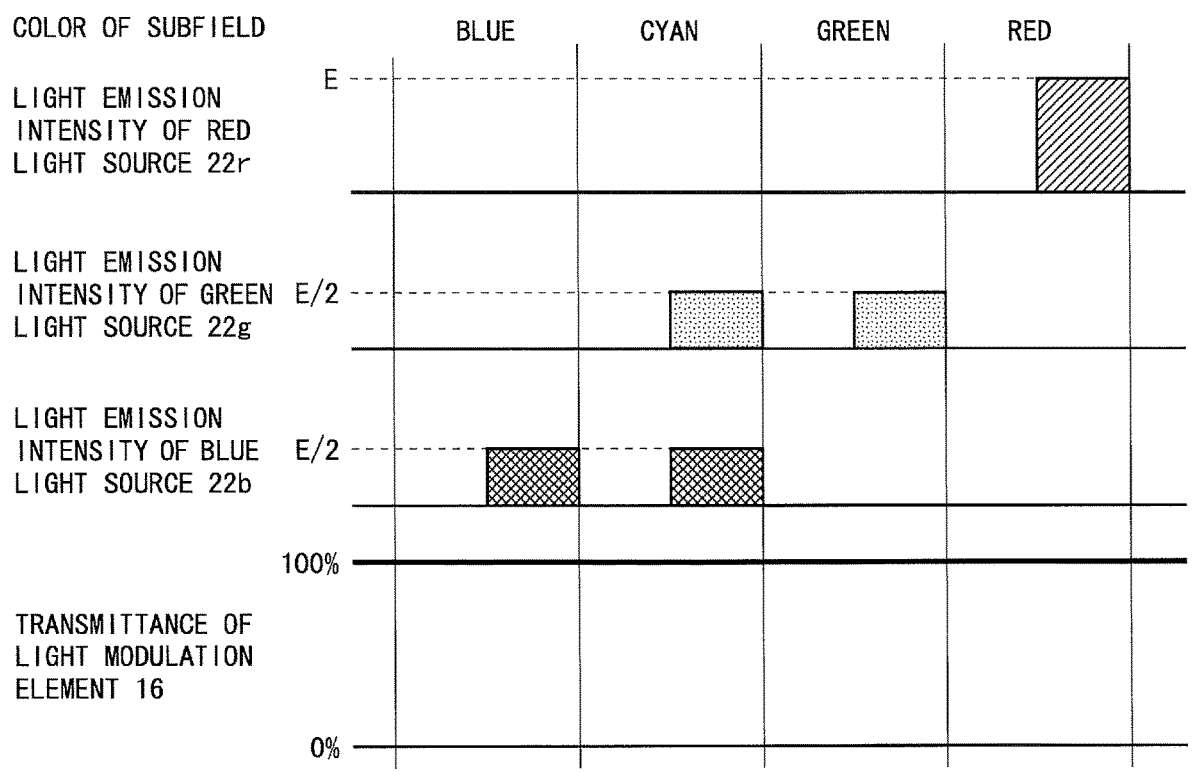
FIG. 7 is a diagram showing light emission intensities of light sources and transmittance of a light modulation element when displaying white by which each gradation of red, green, and blue becomes maximum, in a display device according to a second embodiment.

FIG. 7 is a diagram showing light emission intensities of the light sources 22 and transmittance of the light modulation element 16 when displaying white by which each gradation of red, green, and blue becomes maximum, in the display device according to the present embodiment. Here, it is assumed that the light modulation element 16 is an element. for changing transmittance of light and the display device according to the present embodiment displays the four subfields in an order of blue, cyan, green, and red in one frame period. As shown in FIG. 7, the blue light source 22b emits light in the blue subfield period, the green light source 22g emits light in the green subfield period, and the red light source 22r emits light in the red subfield period. In the cyan subfield period, the green light source 22g and the blue light source 22b emit light.

in the green subfield period and the cyan subfield period, the green light source 22g emits light with a same light emission intensity E/2. In the blue subfield period and the cyan subfield period, the blue light source 22b emits light with the same light emission intensity E/2 as the green light source 22g. In the red subfield period, the red light source 22r emits light with a light emission intensity E twice that of the green light source 22g and the blue light source 22b. In this manner, the light emission intensity of the red light source 22r in the red subfield period is set to twice the light emission intensities of the green light source 22g and the blue light source 22b in other subfield periods. The transmittance of the light modulation element 16 is set to the maximum value of 100% in the blue, cyan, green, and red subfield periods.

In the display device according to the present embodiment, the light emission intensity of the red light. source 22r in the red subfield period is set to twice the light emission intensities of the green light source 22g and the blue light source 22b in other subfield periods. Thus, in the display device according to the present embodiment, as with the display device 10 according to the first embodiment, when the video signal Vi is the white signal, the transmittance in each subfield period can be set to the maximum value of 100%. Therefore, according to the display device according to the present embodiment, as with the display device 10 according to the first embodiment, the light utilization efficiency can be improved and the power consumption of the light source section 21 can be reduced, when compared with the conventional display device.

Figure 8:
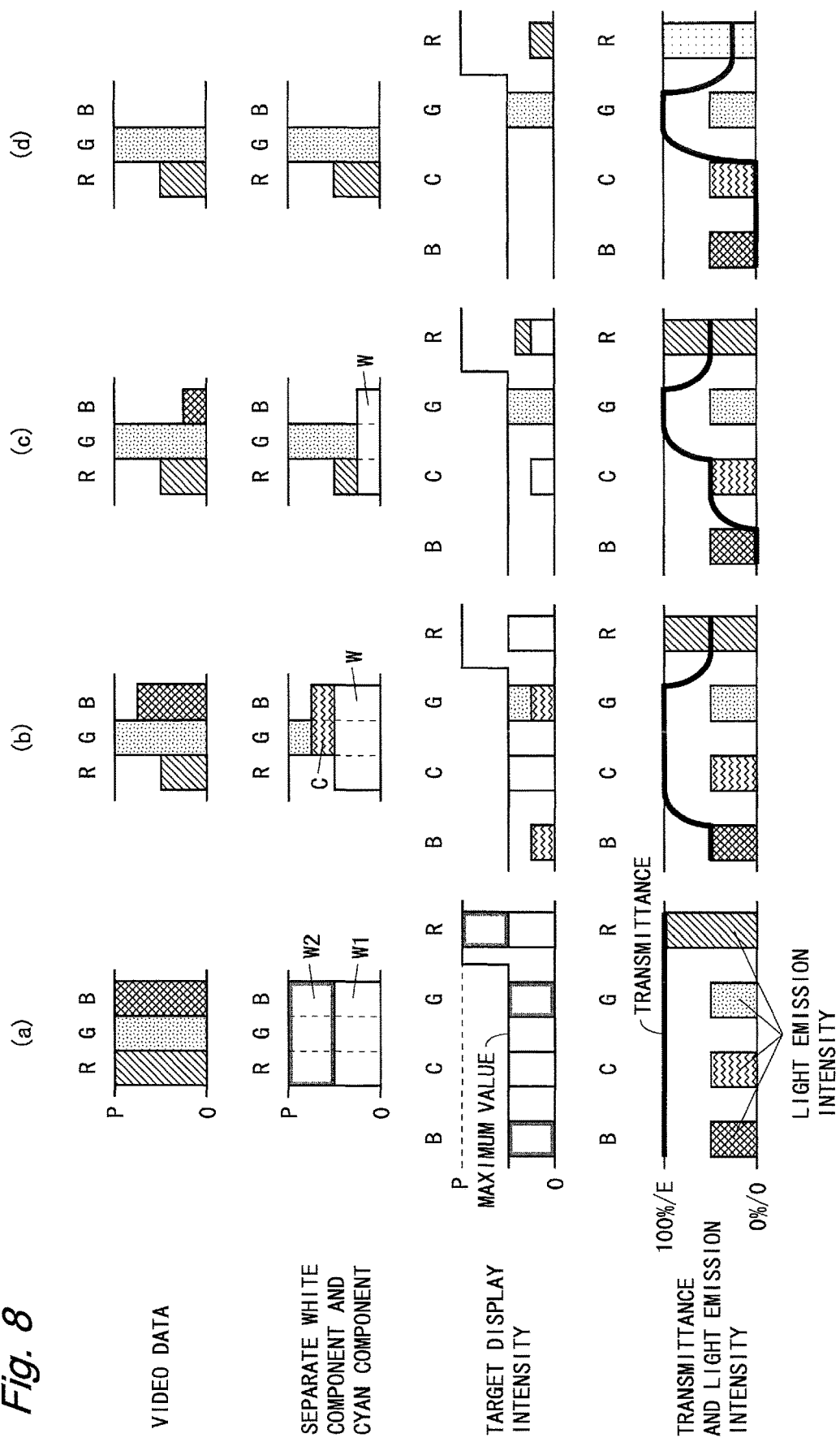
FIG. 8 is a diagram showing processing results by a signal separation section of the display device according to the second embodiment.

The signal separation section 11 according to the present embodiment performs processing in which yellow is replaced with cyan, red is replaced with blue, and blue is replaced with red in FIG. 4. FIG. 8 is a diagram showing processing results by the signal separation section 11 according to the present embodiment. Since the operation of the signal separation section 11 and the processing results by the signal separation section 11 are similar to t hose in the first embodiment, detailed description thereof is omitted here.

In the following, preferable display orders of the subfields when the response speed of the light modulation element 16 is slow are described with respect to the display device according to the present embodiment. As described in the first embodiment, in order to reduce the color shift of the color close to yellow, it is preferable to display the red. subfield next to the green subfield. Furthermore, in order to enhance the effect of reducing the color break, it is preferable to display the cyan subfield between the green subfield and the blue subfield. Four orders of (blue, cyan, green, red), (red, blue, cyan, green), (green, red, blue, cyan), and (cyan, green, red, blue) satisfy the above-described two conditions.

However, if the cyan subfield and the green subfield both having high luminosity characteristics are displayed successively across a boundary of a frame, the color break may occur when displaying a moving image. Considering this point, the order of (green, red, blue, cyan) is not preferable. Therefore, preferable display orders of the subfields in the display device according to the present embodiment are three orders of (blue, cyan, green, red), (red, blue, cyan, green), and (cyan, green, red, blue). The effect of reducing the color break can be enhanced while reducing the uncomfortable feeling due to the color shift of the color close to yellow, by using these three display orders.

As described above, the display device according to the present embodiment includes the light source section 21 including first to third light sources (green light source 22g, blue light source 22b, and red light source 22r) that emit light in first to third colors, and the light modulation section 15. One frame period is divided into three subfield periods (green, blue, and red subfield periods) in each of which one of the first to third light sources emits light and a subfield (green, blue, and red subfields) corresponding to one of the first to third colors is displayed, and one subfield period. (cyan subfield period) in which the first and second light sources (green light source 22g and blue light source 22h) emit light and a subfield (cyan subfield) corresponding to a fourth color (cyan) is displayed. The light emission intensity of the third light source in the subfield period (red subfield period) in which the third light source (red light source 22r) emits light is set to twice the light emission intensities of the first and second light sources in other subfield periods (green, blue, and cyan subfield periods).

In the display device according to the present embodiment, the first color is green, the second color is blue, the third color is red, and the fourth color is cyan. Therefore, effects similar to those of the first embodiment can be attained with respect to a field sequential type display device which displays the green, blue, red, and cyan subfields. In particular, the effect of reducing the color break can be enhanced while reducing the uncomfortable feeling due to the color shift of the color close to yellow, by displaying the four subfields corresponding to the first to fourth colors from the beginning of one frame period in one of the order of blue, cyan, green, and red, the order of red, blue, cyan, and green, and the order of cyan, green, red, and blue.

Third Embodiment

A display device according to a third embodiment has the same configuration as the display device according to the first embodiment (see FIG. 1). As with the display device according to the first embodiment, the display device according to the present embodiment is a field sequential type display device which displays four subfields in one frame period. However, in the display device according to the present embodiment, one frame period is divided into four subfield periods corresponding to red, green, blue, and magenta. The display device according to the present embodiment displays red, green, blue, and magenta subfields in one frame period in an order described later.

Figure 9:
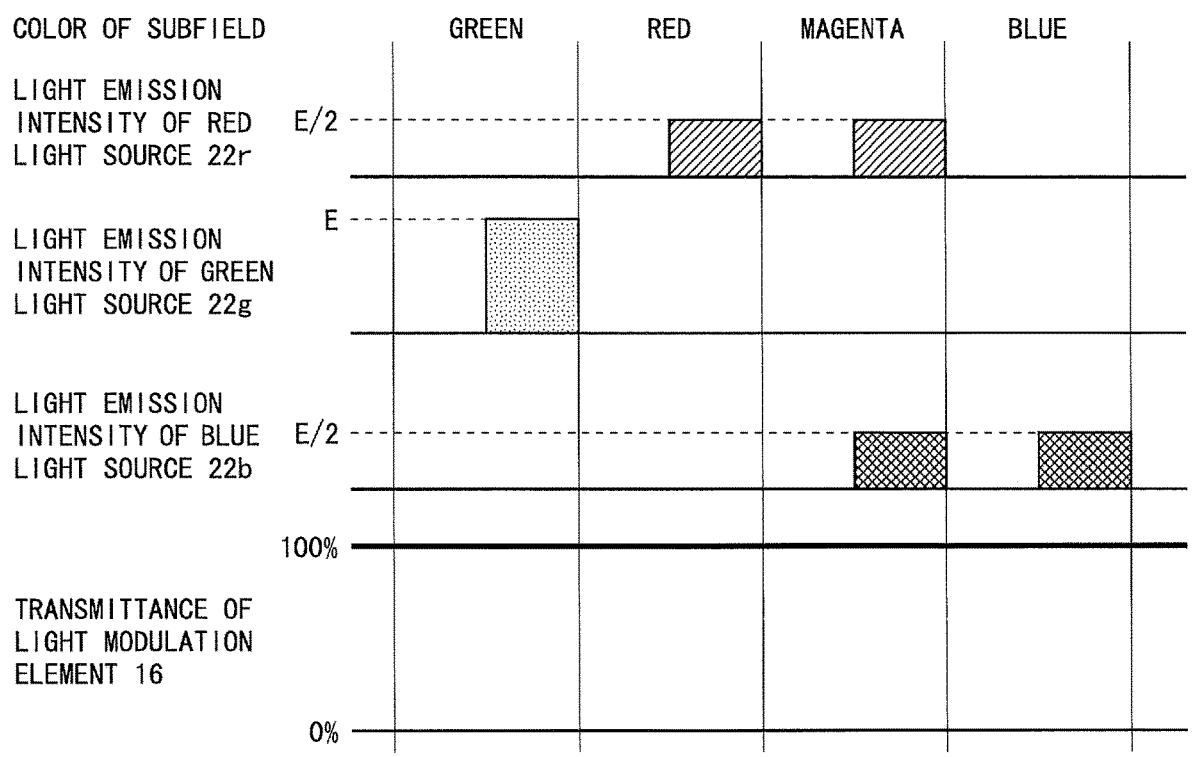
FIG. 9 is a diagram showing light emission intensities of light sources and transmittance of a light modulation element when displaying white by which each gradation of red, green, and blue becomes maximum, in a display device according to a third embodiment.

FIG. 9 is a diagram showing light emission intensities of the light sources 22 and transmittance of the light modulation element 16 when displaying white by which each gradation of red, green, and blue becomes maximum, in the display device according to the present embodiment. Here, it is assumed that the light modulation element 16 is an element for changing transmittance of light and the display device according to the present embodiment displays the four subfields in an order of green, red, magenta, and blue in one frame period. As shown in FIG. 9, the green light source 22g emits light in the green subfield period, the red light source 22r emits light in the red subfield period, and the blue light source 22b emits light in the blue subfield period. In the magenta subfield period, the red light source 22r and the blue light source 22b emit light.

In the red subfield period and the magenta subfield period, the red light source 22r emits light with a same light emission intensity E/2. In the blue subfield period and the magenta subfield period, the blue light source 22b emits light with the same light emission intensity E/2 as the red light source 22r. In the green subfield period, the green light source 22g emits light with a light emission intensity E twice that of the red light source 22r and the blue light source 22b. In this manner, the light emission intensity of the green light source 22g in the green subfield period is set to twice the light emission intensities of the red light source 22r and the blue light source 22b in other subfield periods. The transmittance of the light modulation element 16 is set to the maximum value of 100% in the green, red, magenta, and blue subfield periods.

In the display device according to the present embodiment, the light emission intensity of the green light source 22g in the green subfield period is set to twice the light emission intensities of the red light source 22r and the blue light source 22b in other subfield periods. Thus, in the display device according to the present embodiment, as with the display device according to the first embodiment, when the video signal 1 is the white signal, the transmittance in each subfield period can be set to the maximum value of 100%. Therefore, according to the display device according to the present embodiment, as with the display device according to the first embodiment, the light utilization efficiency can be improved and the power consumption of the light source section 21 can be reduced, when compared with the conventional display device.

Figure 10:
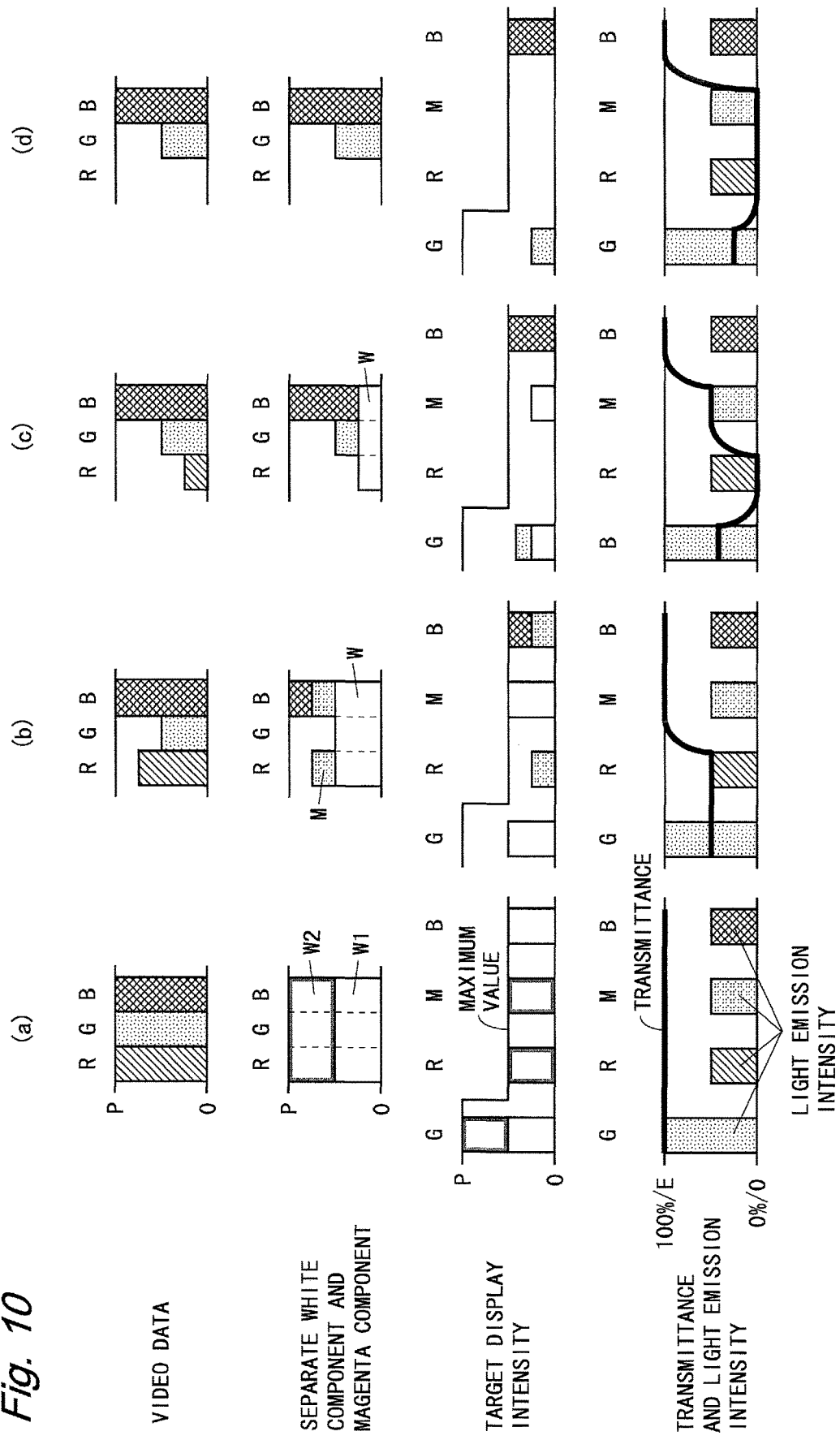
FIG. 10 is a diagram showing processing results by a signal separation section of the display device according to the third embodiment.

The signal separation section 11 according to the present embodiment performs processing in which yellow is replaced with magenta, green is replaced with blue, and blue is replaced with green in FIG. 4. FIG. 10 is a diagram showing processing results by the signal separation section 11 according to the present embodiment. Since the operation of the signal separation section 11 and the processing results by the signal separation section 11 are similar to those in the first embodiment, detailed description thereof is omitted here.

In the following, preferable display orders of the subfields when the response speed of the light modulation element 16 is slow are described with respect to the display device according to the present embodiment. As described in the first embodiment, in order to reduce the colon shift of the color close to yellow, it is preferable to display the red subfield next to the green subfield. Furthermore, in order to enhance the effect of reducing the color break, it is preferable to display the magenta subfield between the red subfield and the blue subfield. Four orders of (green, red, magenta, blue), (blue, green, red, magenta), (magenta, blue, green, red), and (red, magenta, blue, green) satisfy the above-described two conditions. All of these four display orders are preferable as the display order of subfields in the display device according to the present embodiment. The effect of reducing the color break can be enhanced while reducing the uncomfortable feeling due to the colon shift of the color close to yellow, by using these four display orders.

As described above, the display device according to the present embodiment includes the light source section 21 including first to third light sources (blue light source 22b, red light source 22r, and green light source 22g) that emit light in first to third colors, and the light modulation section 15. One frame period is divided into three subfield periods (blue, red, and green subfield periods) in each of which one of the first to third light sources emits light and a subfield (blue, red, and green subfields) corresponding to one of the first to third colors is displayed, and one subfield period (magenta subfield period) in which the first and second light sources (blue light source 22b and red light source 22r) emit light and a subfield (magenta subfield) corresponding to a fourth color (magenta) is displayed. The light emission intensity of the third light source in the subfield period (green subfield period) in which the third light source (green light source 22g) emits light is set to twice the light emission intensities of the first and second light sources in other subfield periods (blue, red, and magenta subfield periods).

In the display device according to the present embodiment, the first color is blue, the second color is red, the third color is green, and the fourth color is magenta. Therefore, effects similar to those of the first embodiment can be attained with respect to a field sequential type display device which displays the blue, red, green, and magenta subfields. In particular, the effect of reducing the color break can be enhanced while reducing the uncomfortable feeling due to the color shift of the color close to yellow, by displaying the four subfield, corresponding to the first to fourth colors from the beginning of one frame period in one of the order of green, red, magenta, and blue, the order of blue, green, red, and magenta, the order of magenta, blue, green, and red, the order of red, magenta, blue, and green.

As described above, a field sequential type display device may include: a light source section including first to third light sources configured to emit light in first to third colors respectively; and a light modulation section including light modulation elements and configured to modulate light emitted from the light source section, one frame period may be divided into three subfield periods in each of which one of the first to third light sources emits light and a subfield corresponding to one of the first to third colors is displayed, and one subfield period in which the first and second light sources emit light and a subfield corresponding to a fourth color is displayed, and light emission intensity of the third light source in the subfield period in which the third light source emits light may be set to twice light emission intensities of the first and second light sources in other subfield periods (first aspect).

When a white signal by which each gradation of the first to third colors becomes maximum is input, the light modulation section may be set to a maximum modulation degree in all subfield periods in one frame period (second aspect). The display device may further include a signal separation section configured to obtain a video signal of four colors used for driving the light modulation section, based on an input video signal of three colors, and the signal separation section may convert a gradation of the video signal of the three colors to a linear gradation that is linear to luminance, may set maximum linear gradations distributable to the subfields corresponding to the first, second, and fourth colors to half of a maximum linear gradation distributable to the subfield corresponding to the third color, and may distribute the linear gradation to four subfields corresponding to the first to fourth colors (third aspect).

The first color may be red, the second color may be green, the third color may be blue, and the fourth color may be yellow (fourth aspect). The display device may display four subfields corresponding to the first to fourth colors from a beginning of one frame period in one of an order of blue, green, red, and yellow, an order of yellow, blue, green, and red, an order of red, yellow, blue, and green, and an order of green, red, yellow, and blue (fifth aspect). The display device may display four subfields corresponding to the first to fourth colors from a beginning of one frame period in one of an order of blue, green, yellow, and red, an order of red, blue, green, and yellow, an order of yellow, red, blue, and green, and an order of green, yellow, red, and blue (sixth aspect).

The first color may be green, the second color may be blue, the third color may be red, and the fourth color may be cyan (seventh aspect). The display device may display four subfields corresponding to the first to fourth colors from a beginning of one frame period in one of an order of blue, cyan, green, and red, an order of red, blue, cyan, and green, and an order of cyan, green, red, and blue (eighth aspect).

The first color may be blue, the second color may be red, the third color may be green, and the fourth color may be magenta (ninth aspect). The display device may display four subfields corresponding to the first to fourth colors from a beginning of one frame period in one of an order of green, red, magenta, and blue, an order of blue, green, red, and magenta, an order of magenta, blue, green, and red, and an order of red, magenta, blue, and green (tenth aspect).

The light modulation section may include a liquid crystal panel (eleventh aspect). The light source section may include a backlight including light emitting diodes as the first to third light sources (twelfth aspect).

Furthermore, a field sequential type display method may be a display method in a field sequential type display device having a light source section including first to third light sources that emit light in first to third colors respectively, and a light modulation section that includes light modulation elements and modulates light emitted from the light source section, the method may include steps of: dividing one frame period into four subfield periods; displaying a subfield corresponding to one of the first to third colors by making one of the first to third light sources emit light in each of three of the four subfield periods; and displaying a subfield corresponding to a fourth color by making the first and second light sources emit light in a remaining subfield period, and light emission intensity of the third light source in the subfield period in which the third light source emits light may be set to twice light emission intensities of the first and second light sources in other subfield periods (thirteenth aspect).

According to the first or thirteenth aspect, color break can be reduced by displaying the subfield corresponding to the fourth color which is a mixed color of the first and second colors, in one frame period in addition to the three subfields corresponding to the first to third colors. Furthermore, by setting the light emission intensity of the third light source in the subfield period in which the third light source emits light to twice the light emission intensities of the first and second light sources in other subfield periods, light intensity of light emitted from the light modulation section can be maximized in all subfield periods in one frame period when a white signal is input. Therefore, light utilization efficiency can be improved and power consumption of the light source section can be reduced.

According to the second aspect, the light intensity of the light output from the light modulation section can be maximized and the light utilization efficiency can be improved, by modulating the light emitted from the light source section with the maximum modulation degree in all subfield periods in one frame period, when the white signal by which each gradation of the first to third colors becomes maximum is input. According to the third aspect, the video signal of the four colors used for driving the light modulation section can be obtained considering the light emission intensities of the light sources in each subfield period, by setting the maximum. linear gradations distributable to the subfields corresponding to the first, second, and fourth colors to half of the maximum linear gradation distributable to the subfield corresponding to the third color.

According to the fourth aspect, effects similar to those of the first to third aspects can be attained with respect to a field sequential type display device which displays red, green, blue, and yellow subfields. According to the fifth aspect, the uncomfortable feeling due to the color shift of the color close to yellow can be reduced, by displaying the red, green, blue, and yellow subfields in one of the above-described four orders. According to the sixth aspect, the effect of reducing the color break can be enhanced while reducing the uncomfortable feeling due to the color shift of the color close to yellow, by displaying the red, green, blue, and yellow subfields in one of the above-described four orders.

According to the seventh aspect, effects similar to those of the first to third aspects can be attained with respect to a field sequential type display device which displays red, green, blue, and cyan subfields. According to the eighth aspect, the effect of reducing the color break can be enhanced while reducing the uncomfortable feeling due to the color shift of the color close to yellow, by displaying the red, green, blue, and cyan subfields in one of the above-described three orders.

According to the ninth aspect, effects similar to those of the first to third aspects can be attained with respect to a field sequential type display device which displays red, green, blue, and magenta subfields. According to the tenth aspect, the effect of reducing the color break can be enhanced while reducing the uncomfortable feeling due to the color shift of the color close to yellow, by displaying the red, green, blue, and magenta subfields in one of the above-described four orders.

According to the eleventh aspect, effects similar to those of the first aspect can be attained with respect to a field sequential type liquid crystal display device. According to the twelfth aspect, effects similar to those of the first aspect can be attained with respect to a field sequential type liquid crystal display device including a backlight including light emitting diodes.

The present application claims priority based on Japanese Patent Application No, 2016-179270 filed on Sep. 14, 2016 and entitled "Field Sequential Type Display Device and Display Method.", and contents or the application are incorporated by reference in the present application.

DESCRIPTION OF REFERENCE CHARACTERS

10: DISPLAY DEVICE
11: SIGNAL SEPARATION SECTION
12: TIMING GENERATION SECTION
13: LIGHT MODULATION SECTION DRIVE CIRCUIT
14: LIGHT SOURCE DRIVE CIRCUIT
15: LIGHT MODULATION SECTION
16: LIGHT MODULATION ELEMENT
21: LIGHT SOURCE SECTION
22: LIGHT SOURCE

The invention claimed is:
1. A field sequential type display device, comprising:
a light source section including first to third light sources configured to emit light in first to third colors respectively; and
a light modulation section including light modulation elements and configured to modulate light emitted from the light source section, wherein
one frame period is divided into three subfield periods in each of which one of the first to third light sources emits light and a subfield corresponding to one of the first to third colors is displayed, and one subfield period in which the first and second light sources emit light and a subfield corresponding to a fourth color is displayed, and light emission intensity of the third light source in the subfield period in which the third light source emits light is set to twice light emission intensities of the first and second light sources in other subfield periods.

2. The display device according to claim 1, wherein when a white signal by which each gradation of the first to third colors becomes maximum is input, the light modulation section is set to a maximum modulation degree in all subfield periods in one frame period.

3. The display device according to claim 1 or 2, further comprising a signal separation section configured to obtain a video signal of four colors used for driving the light modulation section, based on an input video signal of three colors, wherein
the signal separation section converts a gradation of the video signal of the three colors to a linear gradation that is linear to luminance, sets maximum linear gradations distributable to the subfields corresponding to the first, second, and fourth colors to half of a maximum linear gradation distributable to the subfield corresponding to the third color, and distributes the linear gradation to four subfields corresponding to the first to fourth colors.

4. The display device according to claim 1, wherein the first color is red, the second color is green, the third color is blue, and the fourth color is yellow.

5. The display device according to claim 4, wherein four subfields corresponding to the first to fourth colors are displayed from a beginning of one frame period in one of an order of blue, green, red, and yellow, an order of yellow, blue, green, and red, an order of red, yellow, blue, and green, and an order of green, red, yellow, and blue.

6. The display device according to claim 4, wherein four subfields corresponding to the first to fourth colors are displayed from a beginning of one frame period in one of an order of blue, green, yellow, and red, an order of red, blue, green, and yellow, an order of yellow, red, blue, and green, and an order of green, yellow, red, and blue.

7. The display device according to claim 1, wherein the first color is green, the second color is blue, the third color is red, and the fourth color is cyan.

8. The display device according to claim 7, wherein four subfields corresponding to the first to fourth colors are displayed from a beginning of one frame period in one of an order of blue, cyan, green, and red, an order of red, blue, cyan, and green, and an order of cyan, green, red, and blue.

9. The display device according to claim 1, wherein the first color is blue, the second color is red, the third color is green, and the fourth color is magenta.

10. The display device according to claim 9, wherein four subfields corresponding to the first to fourth colors are displayed from a beginning of one frame period in one of an order of green, red, magenta, and blue, an order of blue, green, red, and magenta, an order of magenta, blue, green, and red, and an order of red, magenta, blue, and green.

11. The display device according to claim 1, wherein the light modulation section includes a liquid crystal panel.

12. The display device according to claim 11, wherein the light source section includes a backlight including light emitting diodes as the first to third light sources.

13. A display method in a field sequential type display device having a light source section including first to third light sources that emit light in first to third colors respectively, and a light modulation section that includes light modulation elements and modulates light emitted from the light source section, the method comprising steps of:

dividing one frame period into four subfield periods;

displaying a subfield corresponding to one of the first to third colors by making one of the first to third light sources emit light in each of three of the four subfield periods; and displaying a subfield corresponding to a fourth color by making the first and second light sources emit light in a remaining subfield period, wherein light emission intensity of the third light source in the subfield period in which the third light source emits light is set to twice light emission intensities of the first and second light sources in other subfield periods.

* * * * *